United States Patent
Imai

(10) Patent No.: US 9,838,220 B2
(45) Date of Patent: Dec. 5, 2017

(54) COMMUNICATION METHOD, COMMUNICATION APPARATUS AND NON-TRANSITORY READABLE MEDIUM

(71) Applicant: FUJITSU LIMITED, Kawasaki-shi, Kanagawa (JP)

(72) Inventor: Yuji Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

(21) Appl. No.: 14/299,529

(22) Filed: Jun. 9, 2014

(65) Prior Publication Data

US 2015/0023357 A1    Jan. 22, 2015

(30) Foreign Application Priority Data

Jul. 17, 2013   (JP) .................................. 2013-148823

(51) Int. Cl.
H04L 12/46   (2006.01)
H04L 29/06   (2006.01)

(52) U.S. Cl.
CPC ...... *H04L 12/4641* (2013.01); *H04L 63/0272* (2013.01); *H04L 63/0428* (2013.01); *H04L 63/20* (2013.01)

(58) Field of Classification Search
None
See application file for complete search history.

(56) References Cited

U.S. PATENT DOCUMENTS 8,289,845 B1 * 10/2012 Baldonado ............. H04L 43/16
                                                                          370/229
2008/0037557 A1   2/2008 Fujita et al.

FOREIGN PATENT DOCUMENTS

EP   1071252 A2   1/2001
JP   10-271167    10/1998

OTHER PUBLICATIONS

Extended European Search Report dated Feb. 3, 2015 for corresponding European Patent Application No. 14172136.5, 4 pages.

* cited by examiner

*Primary Examiner* — Michael Thier
*Assistant Examiner* — Kent Krueger
(74) *Attorney, Agent, or Firm* — Fujitsu Patent Center

(57) ABSTRACT

A communication method includes determining a difference state of identification numbers of communication providers corresponding to a plurality of relay transfer apparatuses on a passing outward path to an opposing communication apparatus and on a passing return path from the opposing apparatus; and switching a first virtual communication channel set between intranets and a second virtual communication channel set between the intranets to dynamically substitute and use a first communication mode of transmitting and receiving encrypted communication data to and from the opposing apparatus through the first virtual communication channel and a second communication mode of transmitting and receiving plain text communication data to and from the opposing apparatus through the second virtual communication channel, according to the determination of the difference state of the identification numbers of the providers.

5 Claims, 11 Drawing Sheets

COMMUNICATION METHOD, COMMUNICATION APPARATUS AND NON-TRANSITORY READABLE MEDIUM

CROSS-REFERENCE TO RELATED APPLICATION

This application is based upon and claims the benefit of priority of the prior Japanese Patent Application No. JP2013-148823, filed on Jul. 17, 2013, the entire contents of which are incorporated herein by reference.

FIELD

The disclosures made herein relate to a communication method and further relate to a communication apparatus and a non-transitory readable medium.

BACKGROUND

There is a wide-area intranet-to-intranet communication system, in which intranets compatible with a plurality of bases distributed and arranged through a wide area on the basis of countries or regions are connected by a relay transfer medium including at least one of a relay line and a relay network to perform communication. Leakage of communication data to the outside needs to be prevented in the wide-area intranet-to-intranet communication system.

The following is a related art to the invention.

[Patent document 1] Japanese Patent Laid-Open Publication No. JP H10-271167

SUMMARY

The intranet-to-intranet connection in the wide-area intranet-to-intranet communication system is mainly classified into the following three modes Types 1, 2, and 3.

Type 1 (see FIG. 1(A)) is a mode of connecting intranets (for example, corporate intranets) by using data centers (for example, DC Tokyo and DC Osaka) possessed by a communication provider and using a private line between the data centers. Type 1 is a mode of connecting the intranets by dark fiber lent as a relay transfer medium from an independent network operator. In the connection mode of Type 1, a plurality of client computers (hosts) are connected to a router arranged in each intranet.

Type 2 (see FIG. 1(B)) is a mode of connecting intranets by using a leased line service of full-time connection (one-to-one communication) provided by a communication provider or by using an IP-VPN (Internet Protocol-Virtual Private Network) service for setting a virtual closed network (virtual private network) in which a third party is prevented from accessing an IP (Internet Protocol) network of a communication provider. In the connection mode of Type 2, an edge router arranged in the network of the communication provider and routers arranged in the intranets oppose, and a plurality of client computers are connected to the router arranged in each intranet.

Type 3 (see FIG. 1(C)) is a mode of connecting intranets by using an Internet VPN (Internet Virtual Private Network) that handles the Internet, which is a public network, as a virtual private network for corporate communication. In the connection mode of Type 3, edge routers (R) arranged in the networks of communication providers (in this case, ISPs (Internet Service Providers)) and routers arranged in the intranets oppose, and a plurality of client computers are connected to the router arranged in each intranet. An IPsec tunnel for guaranteeing the security is set between the routers (VPN routers) arranged in the intranets.

In the connection modes of Types 1 and 2, the communication provider including an independent network operator takes responsibility for the isolation of a relay line as a relay transfer medium and a relay network. Therefore, there is no problem of leakage of communication data to the outside.

In the connection mode of Type 3, the Internet is used as a virtual private network of corporate communication. Therefore, the cost can be significantly reduced compared to the connection modes of Types 1 and 2. However, the communication provider (ISP) that transfers communication data changes from moment to moment in an outward path and a return path of the communication path. Therefore, it is difficult to specify the responsibility for the management of the relay transfer medium, and measures for preventing leakage of communication data to the outside are needed.

The IPsec tunnel is a security guarantee tunnel for transferring communication data (encapsulated encrypted packet) encrypted according to an ESP (Encapsulating Security Payload) protocol in IPsec (IP Security Protocol). The IPsec tunnel can prevent leakage of communication data to the outside.

In the connection mode of Type 3, the VPN routers statically encrypt the communication data and transmit and receive encapsulated encrypted packets through the IPsec tunnel. The manager of the VPN routers takes responsibility to ensure the isolation. However, when the encapsulated encrypted packet is transmitted or received, the packet length of the encapsulated encrypted packet is larger than the original plain text IP packet, due to the encryption (including authentication) process and the encapsulation process. The increase in the packet length degrades and fixes the communication performance, and the increase becomes an inhibiting factor in promoting to provide a wideband virtual network service with reduced delay.

According to an aspect of the disclosures made herein, a communication method executed by a processor, the communication method includes determining a difference state of identification numbers of communication providers corresponding to a plurality of relay transfer apparatuses on a passing outward path to an opposing communication apparatus and on a passing return path from the opposing communication apparatus; and switching a first virtual communication channel set between intranets and a second virtual communication channel set between the intranets to dynamically substitute and use a first communication mode of transmitting and receiving encrypted communication data to and from the opposing communication apparatus through the first virtual communication channel and a second communication mode of transmitting and receiving plain text communication data to and from the opposing communication apparatus through the second virtual communication channel, according to the determination of the difference state of the identification numbers of the communication providers.

Objects and advantages of the disclosures will be realized and attained by means of the elements and combinations particularly pointed out in the claims.

DESCRIPTION OF EMBODIMENTS

Figure 1:
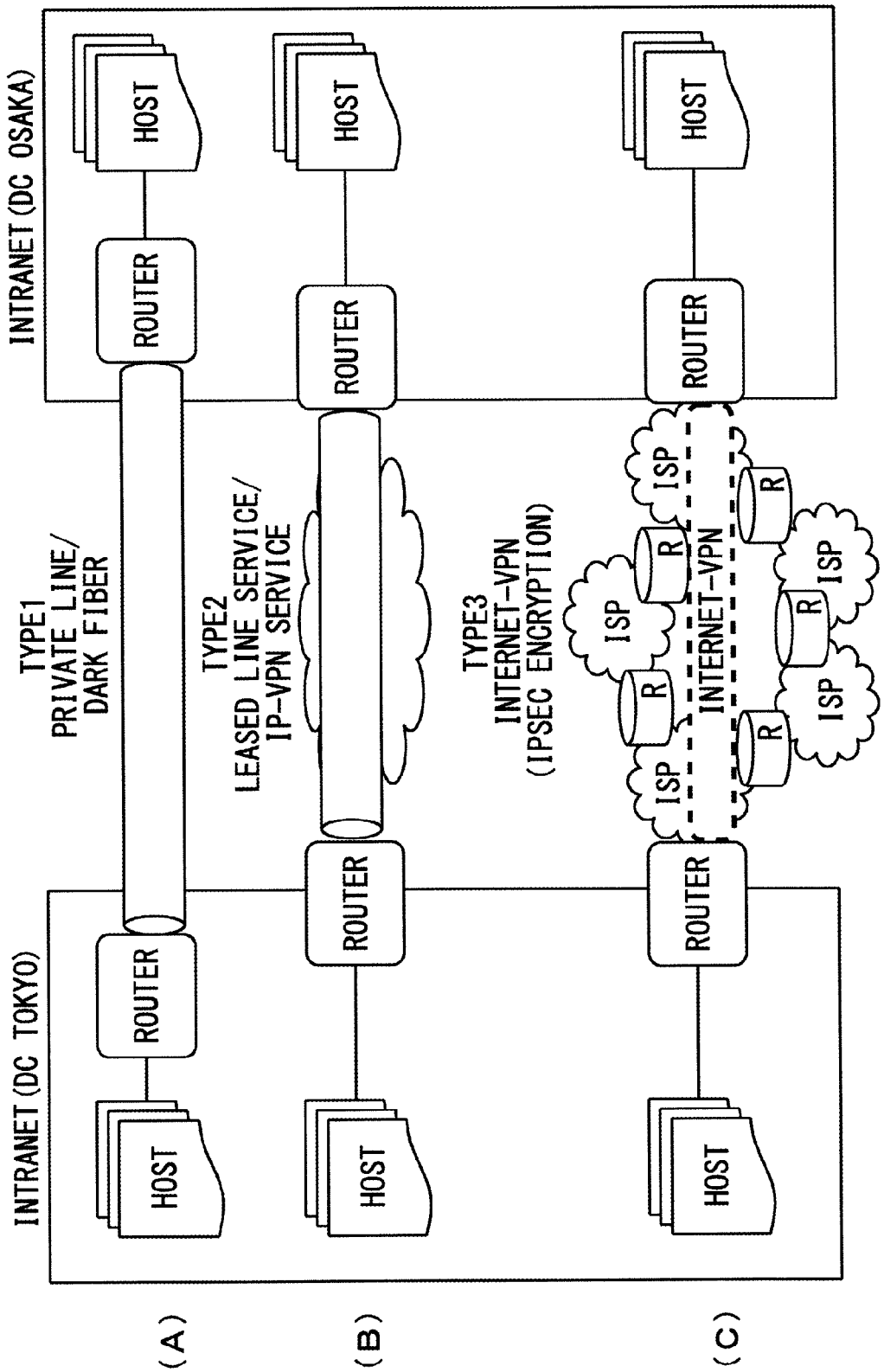
FIG. 1 is a diagram for describing wide-area intranet-to-intranet connection modes in a related technique.

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

First Embodiment

[System]

Figure 2:
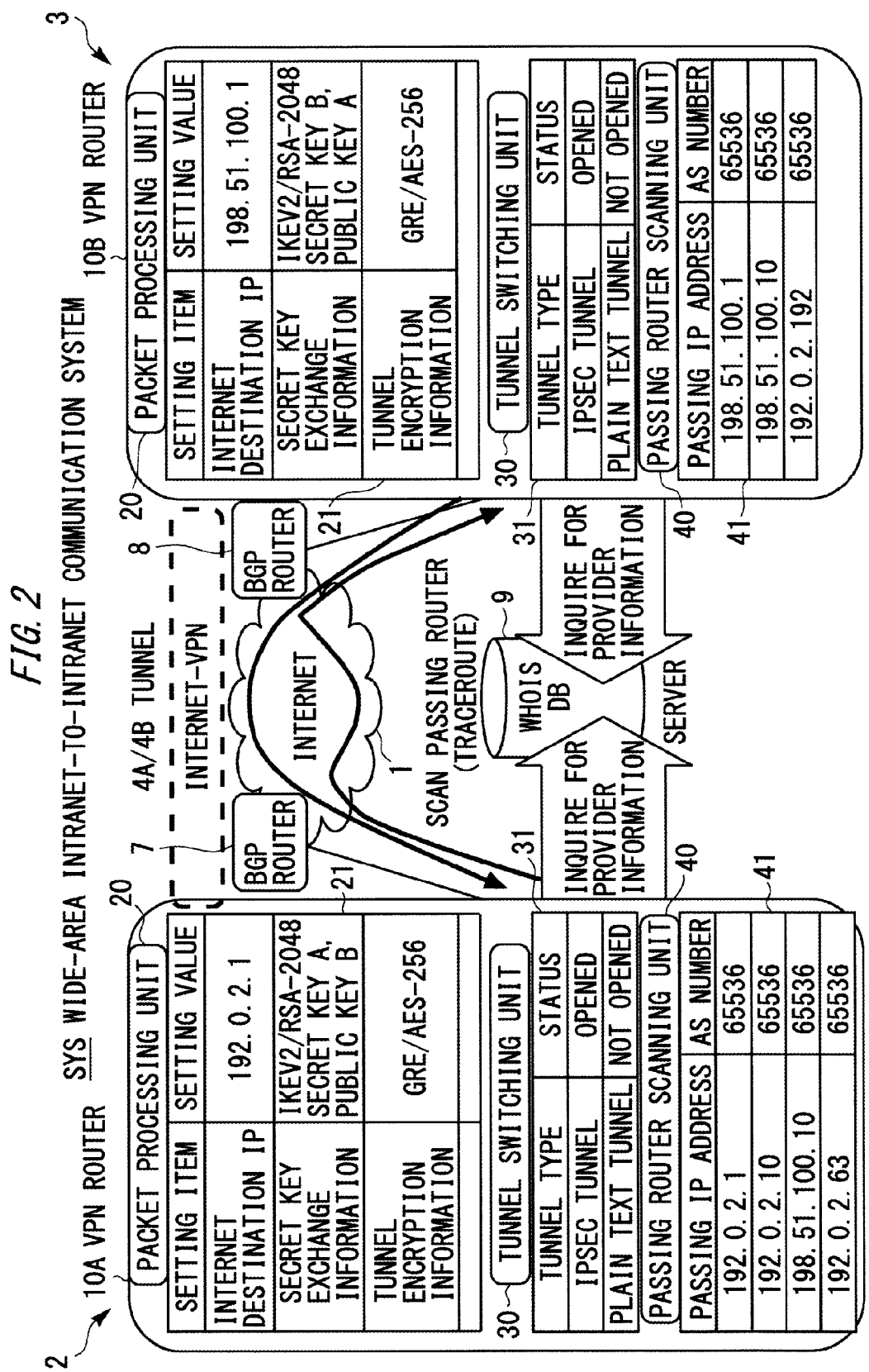
FIG. 2 is a diagram illustrating a configuration of a system and VPN routers in a first embodiment.

With reference to FIG. 2 illustrating a configuration of a system in a first embodiment, intranets (for example, corporate networks) compatible with a plurality of bases distributed and arranged through a wide area on the basis of countries or regions are connected by a relay transfer medium to perform communication in a wide-area intranet-to-intranet communication system SYS.

The wide-area intranet-to-intranet communication system SYS adopts a mode (see Type 3 described above) of connecting a first intranet 2 and a second intranet 3 by using an Internet VPN (Internet Virtual Private Network) that handles Internet 1, which is a relay transfer medium, as a virtual private network for corporate communication.

In the wide-area intranet-to-intranet communication system SYS, the opposing first intranet 2 and second intranet 3 (to be exact, client computers housed in the intranets 2 and 3) transmit and receive communication data in a form of packets through the Internet 1.

In this case, a VPN router 10A housed in the first intranet 2 and a VPN router 10B housed in the second intranet 3 form a tunneling connection through a tunnel that is a communication channel virtually set in the Internet 1.

The VPN router 10A and the VPN router 10B adopt a first communication mode of transmitting and receiving communication data (encapsulated encrypted packet) encrypted through a first IP tunnel (IPsec tunnel) 4A to guarantee the security. The IPsec tunnel is a security guarantee tunnel for transferring (including exchanging and forwarding if not particularly limited) the encapsulated encrypted packet according to an ESP (Encapsulating Security Payload) protocol in IPsec (IP security Protocol). The IPsec tunnel can prevent leakage of communication data to the outside.

When the encapsulated encrypted packet is transmitted or received through the IPsec tunnel 4A, the packet length of the encapsulated encrypted packet is larger than the original plain text IP packet (may be simply described as a plain text packet), due to the encryption (including authentication) process and the encapsulation process. The increase in the packet length degrades and fixes the communication performance, and the increase becomes an inhibiting factor in promoting to provide a wideband virtual network service with reduced delay.

Therefore, the VPN router 10A and the VPN router 10B in the wide-area intranet-to-intranet communication system SYS adopt a second communication mode of transmitting and receiving the encapsulated plain text packet through a second IP tunnel (plain text tunnel) 4B if permissive conditions described in detail later are satisfied. The first communication mode and the second communication mode are dynamically substituted and used according to the permissive conditions.

Figure 3:
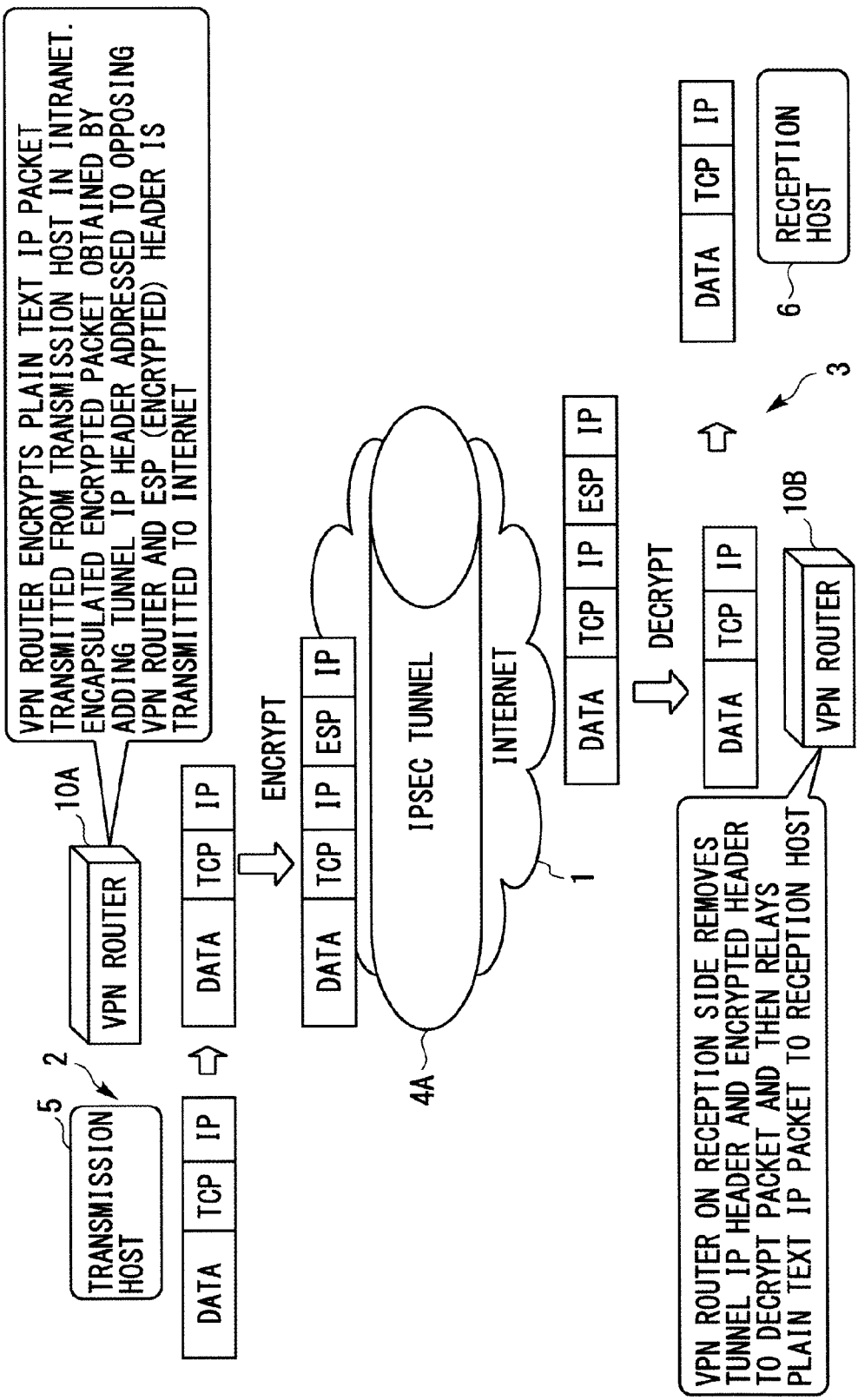
FIG. 3 is a diagram for describing packets transmitted and received in the system of the first embodiment.

With reference to FIG. 3, the VPN router 10A on the transmission side of the Internet 1 encrypts a plain text IP packet sent out from a client computer (transmission host) 5 in the first intranet 2. The VPN router 10A then transmits, to the IPsec tunnel 4A of the Internet 1, an encapsulated encrypted packet obtained by adding an IP header (tunnel IP header) addressed to the opposing VPN router 10B and an ESP header (encrypted header).

The VPN router 10B on the reception side of the IPsec tunnel 4A of the Internet 1 removes the tunnel IP header and the encrypted header from the received encapsulated encrypted packet to decrypt the packet and then relays the plain text IP packet to a client computer (reception host) 6 in the second intranet 3. The plain text IP packet includes an IP header, a TCP (Transmission Control Protocol) header, and payload data. The encapsulated plain text packet transmitted and received through the plain text tunnel 4B adopts a mode obtained by adding just the tunnel IP header to the plain text IP packet.

With reference again to FIG. 2, the Internet 1 is equipped with a plurality of routers including BGP (Border Gateway Protocol) routers 7 and 8 possessed (operated) by a plurality of communication providers (in this case, Internet Service Providers ISPs).

The Internet 1 is also equipped with a server 9 including a database DB (specifically, Whois DB) of an IP address registry. The IP address registry is a Regional Internet Registry (RIR) and is a registry for managing allocation of IP addresses and AS (Autonomous System) numbers in a specific region. There are five management organizations, such as APNIC (Asia Pacific Network Information Center), ARIN (American Registry for Internet Numbers), and RIPE NCC (Reseaux IP Europeans Network Coordination Center).

[VPN Routers]

Next, details of the VPN router 10A and the VPN router 10B in the wide-area intranet-to-intranet communication system SYS will be described.

Figure 4:
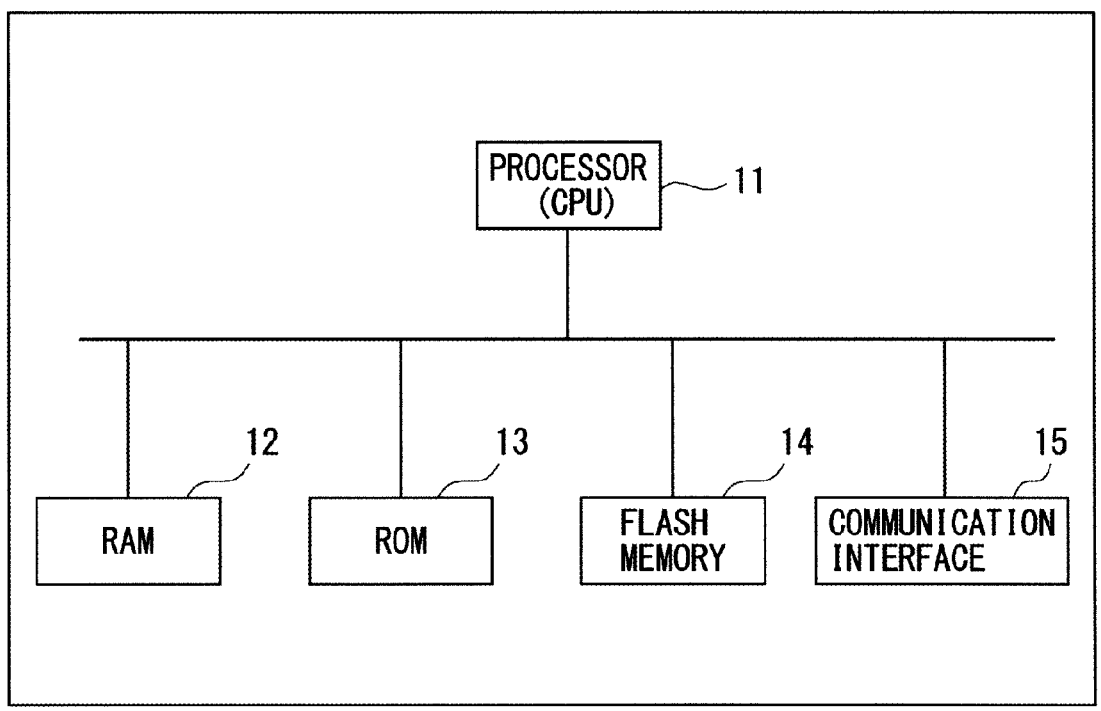
FIG. 4 is a diagram illustrating a hardware configuration of the VPN router in the first embodiment.
Figure 5:
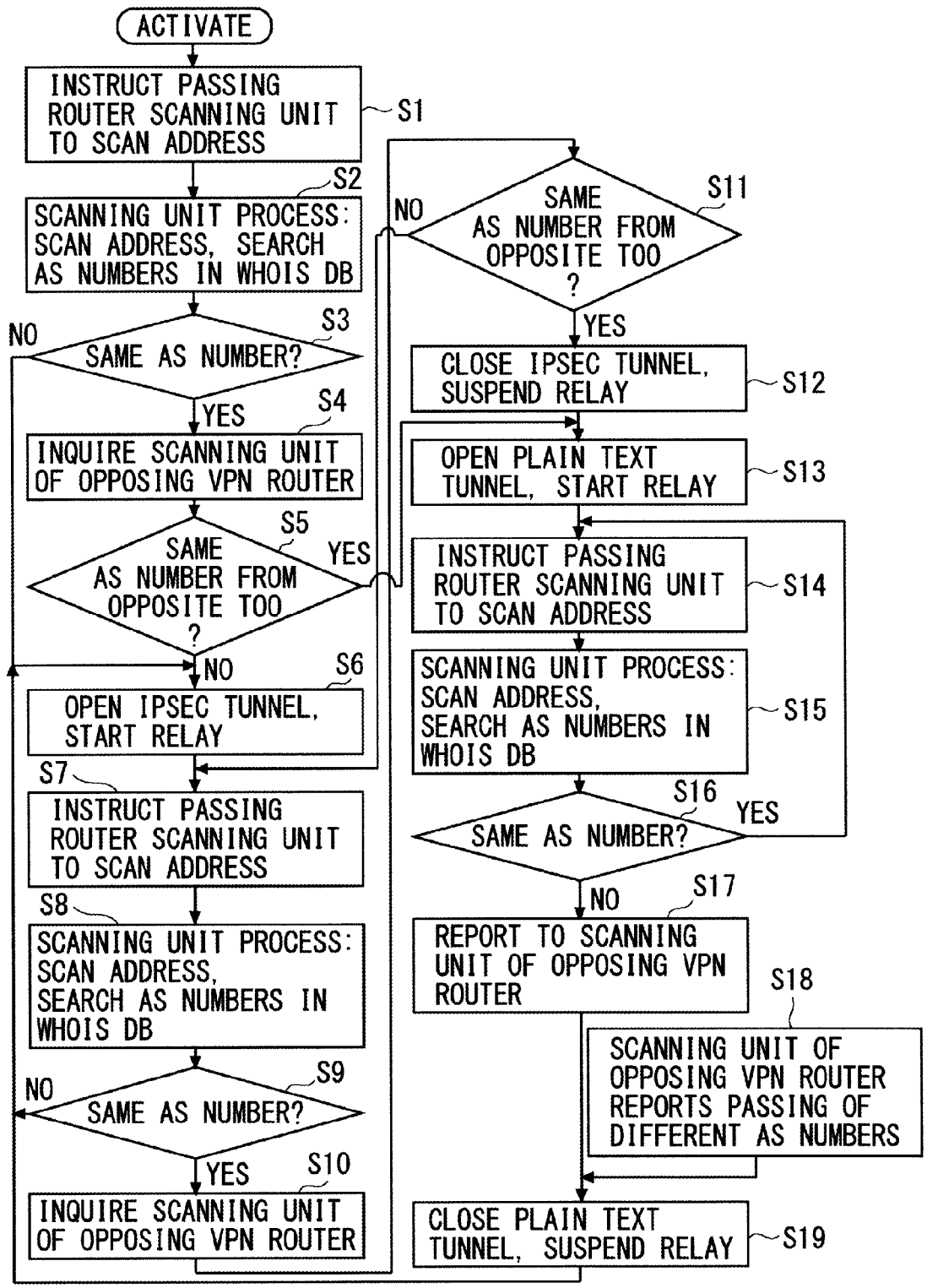
FIG. 5 is a flowchart for describing a passing router scanning process in the system of the first embodiment.

With reference to FIGS. 2 and 4, the VPN router 10A and the VPN router 10B as communication apparatuses include the following elements as a hardware configuration. More specifically, each of the VPN router 10A and the VPN router 10B includes a CPU (Central Processing Unit) 11 as a processor, a RAM (Random Access Memory) 12 as a working memory, and a ROM (Read Only Memory) 13 storing a boot program for startup.

Each of the VPN router 10A and the VPN router 10B further includes, among other things: a rewritable non-volatile flash memory 14 storing an OS (Operating System), various application programs, and various information (including data); and a communication interface 15.

More specifically, each of the VPN router 10A and the VPN router 10B includes, as functional configuration elements, a packet processing unit 20, a tunnel switching unit 30, and a passing router scanning unit 40 as a determination unit.

Setting items and setting values are associated and stored in a setting information table 21 referenced and set in advance by the packet processing unit 20 based on an instruction from a VPN router manager.

In this example, the setting information table 21 of the VPN router 10A stores (holds) Internet destination IP address: 192.0.2.1, secret key exchange information: IKEv2/RSA-2048, secret key A, and public key B, and tunnel encryption information: GRE/AES-256. The Internet destination IP address [192.0.2.1] is an IP address of an Internet-enabled port of the VPN router 10B in which the opposing relationship is set in advance.

The setting information table 21 of the VPN router 10B stores Internet destination IP address: 198.51.100.1, secret key exchange information: IKEv2/RSA-2048, secret key B, and public key A, and tunnel encryption information: GRE/AES-256. The Internet destination IP address [198.51.100.1] is an IP address of an Internet-enabled port of the VPN router 10A in which the opposing relationship is set in advance.

Tunnel types and opening statuses are associated and stored in a tunnel type table 31 referenced and set by the tunnel switching unit 30. In this example, IPsec tunnel: opened and plain text tunnel: not opened (closed) are stored as prerequisite (initial) conditions in the tunnel type tables 31 of the VPN routers 10A and 10B.

Passing IP addresses and AS numbers are associated and stored in a passing router table 41 referenced and set by the passing router scanning unit 40. The passing IP address is an IP address (for example, 198.51.100.10) compatible with a router passed before the Internet destination IP address. The AS number is a number of the ISP provider (for example, 65536) possessing the passing router. The passing router scanning unit 40 inquires the server 9 including the database DB of the IP address registry for provider information to acquire the AS number corresponding to the passing IP address.

To logically realize a packet processing function and a passing router scan processing function of the packet processing unit 20, the tunnel switching unit 30, and the passing router scanning unit 40 described in detail later, a control program is installed as an application program on the flash memory 14 in the VPN router 10A and the VPN router 10B. In the VPN router 10A and the VPN router 10B, the CPU 11 executes the control program by expanding the control program in the RAM 12 all the time when the power is activated. The setting information table 21, the tunnel type table 31, and the passing router table 41 can be formed in the flash memory 14.

[Packet Processing]

Subsequently, packet processing in the VPN router 10A and the VPN router 10B of the wide-area intranet-to-intranet communication system SYS will be described.

With reference to FIG. 2, in the VPN router 10A on the transmission side housed in the first intranet 2, the packet processing unit 20 applies an encryption process, an authentication process, and an encapsulation process to a plain text IP packet from the client computer 5 received by a reception unit (not illustrated) to generate an encapsulated encrypted packet.

In this generation process, the packet processing unit 20 refers to the setting information table 21 set in advance to execute the encryption process and the authentication process according to an encryption algorithm compatible with tunnel encryption information and according to an authentication algorithm compatible with secret key exchange information.

The packet processing unit 20 sets the IP address [198.51.100.1] compatible with the VPN router 10A and the IP address [192.0.2.1] compatible with the VPN router 10B in the transmission source address and the destination address, respectively, in the tunnel IP header of the generated encapsulated encrypted packet.

A transmission unit (not illustrated) transmits the encapsulated encrypted packet to the opposing VPN router 10B through the IPsec tunnel 4A of the Internet 1.

In the VPN router 10B on the reception side housed in the second intranet 3, a reception unit (not illustrated) receives the encapsulated encrypted packet transmitted from the opposing VPN router 10A through the IPsec tunnel 4A of the Internet 1.

The packet processing unit 20 applies a decryption process, an authentication process, and a decapsulation process to the received encapsulated encrypted packet to generate a plain text packet.

In this generation process, the packet processing unit 20 refers to the setting information table 21 set in advance to execute the decryption process and the authentication process according to an encryption algorithm compatible with tunnel encryption information and according to an authentication algorithm compatible with secret key exchange information.

A transmission unit (not illustrated) transmits the generated plain text packet to the client computer 6 corresponding to the receiving end of the second intranet 3.

When the opposing VPN router 10A and VPN router 10B transmit and receive the encapsulated plain text packet through the plain text tunnel 4B of the Internet 1, the encryption process and the authentication process by the packet processing unit 20 of the VPN router 10A as well as the decryption process and the authentication process by the packet processing unit 20 of the VPN router 10B are not executed.

Which one of the first communication mode of transmitting and receiving the encapsulated encrypted packet through the IPsec tunnel 4A and the second communication mode of transmitting and receiving the encapsulated plain text packet through the plain text tunnel 4B will be adopted when the packet processing unit 20 of each of the VPN routers 10A and 10B executes the packet processing is determined based on cooperation with a passing router scanning process by the tunnel switching unit 30 and the passing router scanning unit 40.

Although the VPN router 10A and the VPN router 10B in the wide-area intranet-to-intranet communication system SYS have packet processing functions of the transmission side and the reception side in the description, respectively, those skilled in the art can easily understand that each of the VPN routers 10A and 10B has both packet processing functions in the actual operation.

[Passing Router Scanning Process]

Subsequently, the passing router scanning process in the VPN router 10A and the VPN router 10B of the wide-area intranet-to-intranet communication system SYS will be described with reference to FIGS. 2, 5, 6, and 7.

After activated from the control program, the packet processing units 20, the tunnel switching units 30, and the passing router scanning units 40 in the VPN router 10A and the VPN router 10B concurrently execute the passing router scanning process described next.

S1: For example, when activated from the control program, the tunnel switching unit 30 in the VPN router 10A instructs the passing router scanning unit 40 to perform passing router scan (to be exact, passing IP address scan) to search for communication paths (passing outward paths) to the opposing VPN router 10B.

S2: The instructed passing router scanning unit 40 performs the passing router scan to search for the AS numbers of the communication providers in the database DB of the IP address registry, for the IP addresses of all detected routers.

More specifically, when the passing router scan is instructed by the tunnel switching unit 30, for example, the passing router scanning unit 40 in the VPN router 10A executes a scan command (in this case, traceroute) up to the opposing VPN router 10B based on an ICMP (Internet Control Message Protocol) packet.

As a result of the execution of the scan command, a list of next hop addresses up to the opposing VPN router 10B, that is, a list of IP addresses of adjacent routers that forward the packet next in the routing, is obtained along with response time, as illustrated next.

Figure 6:
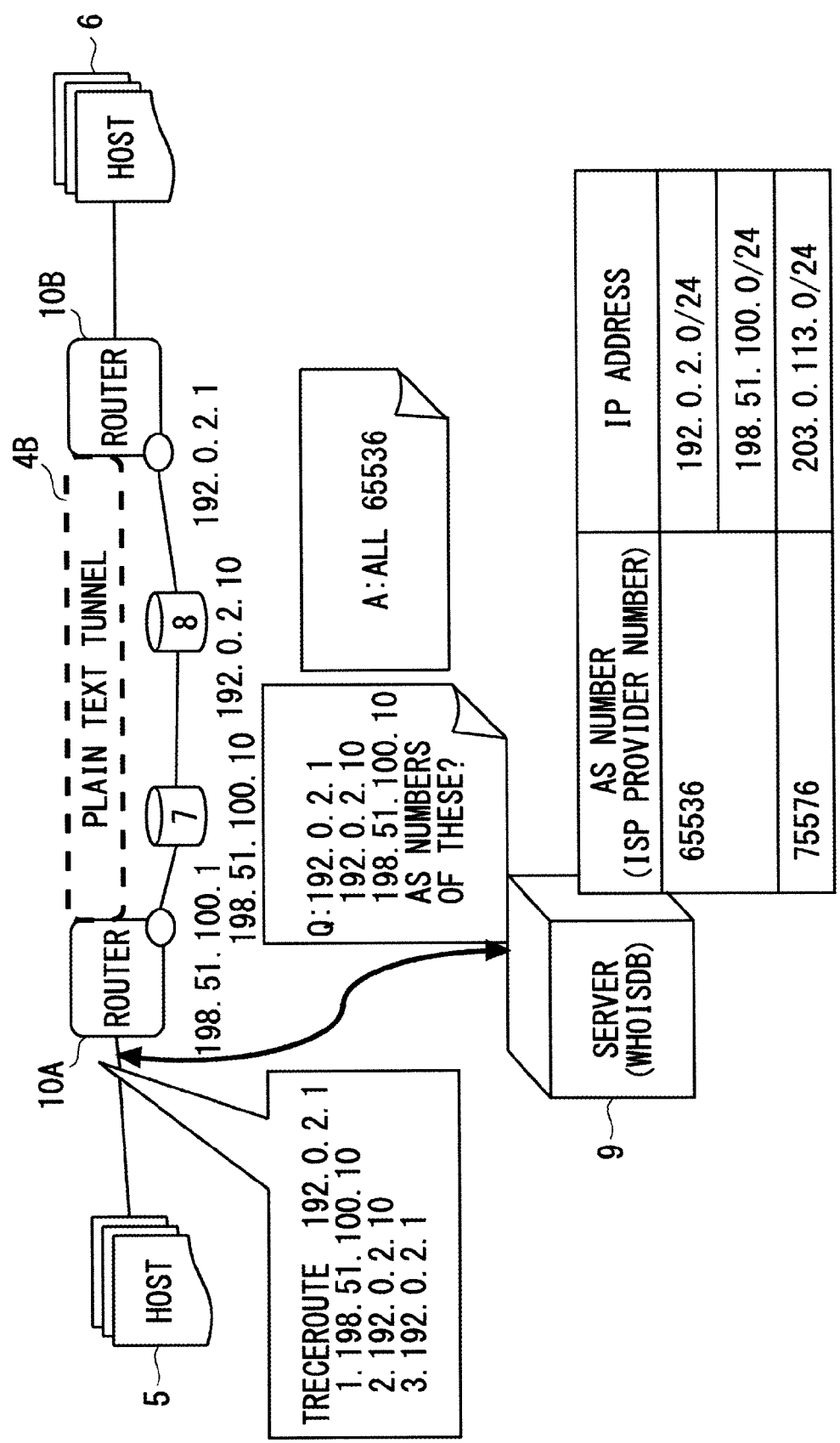
FIG. 6 is a diagram for describing the passing router scanning process in the system of the first embodiment.
Figure 7:
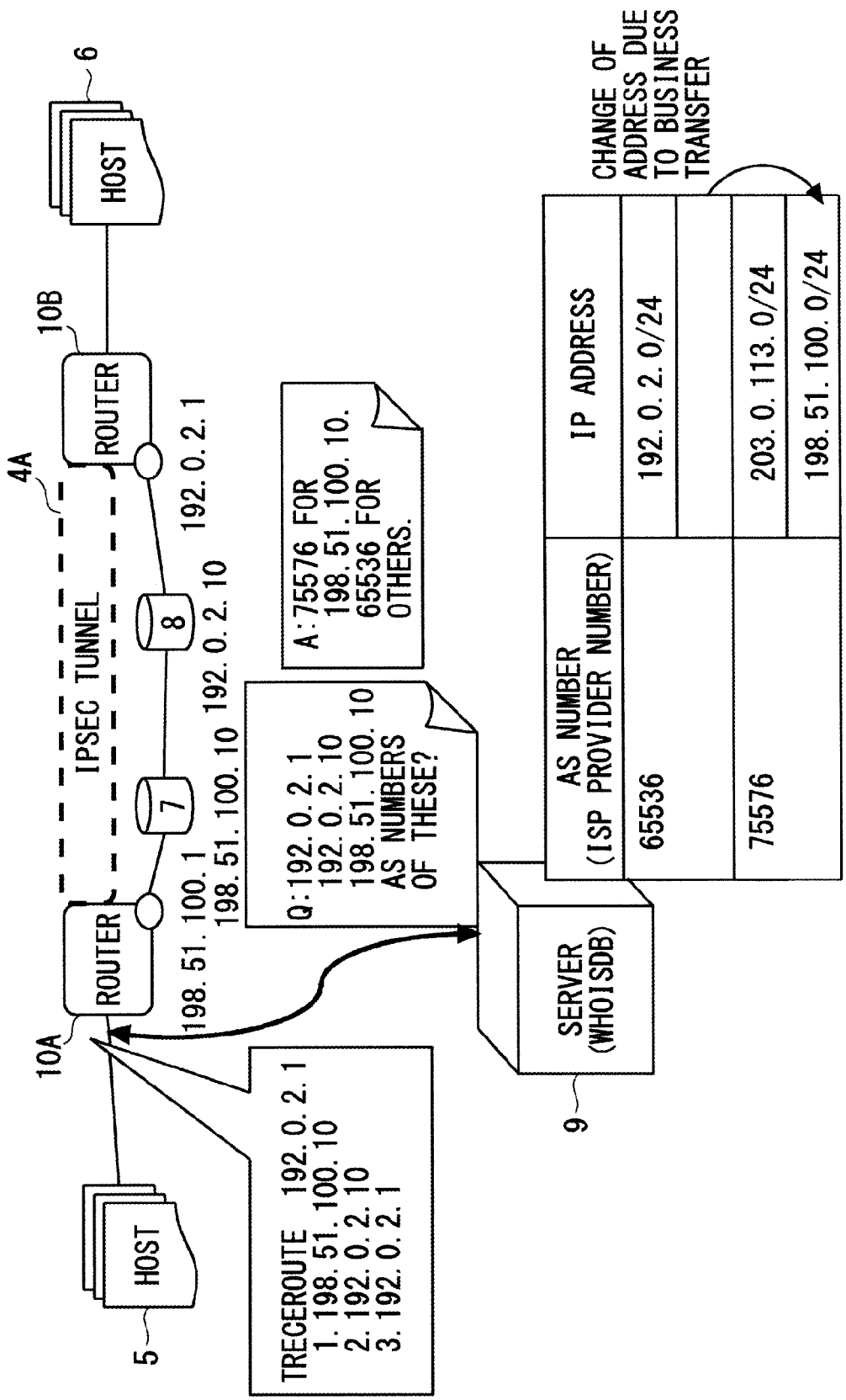
FIG. 7 is a diagram for describing the passing router scanning process in the system of the first embodiment.

$ traceroute-A oviss2.jp.fj.com
1 198.51.100.10 4.705 ms
2 133.160.152.241 10.764 ms
3 133.160.152.253 11.392 ms
4 133.160.127.5 13.003 ms
5 133.160.100.5 17.574 ms
6 133.160.101.58 24.734 ms
7 192.0.2.10 27.935 ms
8 192.0.2.1 31.564 ms Next, the passing router scanning unit 40 inquires the server 9, which includes the database DB (specifically, Whois DB) of the IP address registry, for the AS numbers (ISP provider numbers) of the communication providers that perform connection services in relation to the IP address [198.51.100.10] of the BGP router 7, the IP address [192.0.2.10] of the BGP router 8, the IP address [192.0.2.1] of the VPN router 10B, and the like obtained by the execution of the scan command (see FIGS. 6 and 7).

The server 9 that has received the inquiry searches the database DB of the IP address registry and returns the IP addresses and the corresponding AS numbers to the passing router scanning unit 40.

In an example illustrated in FIG. 6, the same AS number [65536] is returned to the passing router scanning unit 40 as the corresponding AS number. In an example illustrated in FIG. 7, different AS numbers [65536] and [75576] are returned to the passing router scanning unit 40 as the corresponding AS numbers. The example illustrated in FIG. 6 corresponds to a case such as when the communication provider that provides the connection service to the VPN router 10A is changed due to business transfer, and the addresses in the database DB of the IP address registry are changed.

An example of the inquiry command and the response is as follows.
$ whois -h whois.apnic.net 192.0.2.1
ASN|IP|Name
65536|192.0.2.1|FJ LIMITED The passing router scanning unit 40 of the VPN router 10A stores the content of the response from the server 9 in the passing router table 41.

S3: The passing router scanning unit 40 of the VPN router 10A refers to the passing router table 41 to determine whether all of the passing IP addresses correspond to the same AS number. If the determination is affirmative, process S4 is executed. If the determination is negative, process S6 is executed.

S4: If the determination is affirmative in process S3, the passing router scanning unit 40 of the VPN router 10A inquires the passing router scanning unit 40 of the opposing VPN router 10B that similarly and concurrently carries out the passing router scan for the scan status, in order to search for the communication paths (passing return paths) to the opposing VPN router 10A.

S5: The passing router scanning unit 40 of the VPN router 10A determines whether the scan result from the opposing VPN router 10B [indicates that all of the passing IP addresses correspond to the same AS number]. If the determination is affirmative, process S13 is executed. If the determination is negative, process S6 is executed.

S6: If the determination is negative in process S3 or S5, the passing router scanning unit 40 of the VPN router 10A requests the tunnel switching unit 30 to open the IPsec tunnel 4A. The tunnel switching unit 30 refers to the tunnel type table 31 to check the opening status [opened] of the IPsec tunnel 4A and then requests the packet processing unit 20 to start packet relay. The packet processing unit 20 carries out packet communication with the packet processing unit 20 of the opposing VPN router 10B through the IPsec tunnel 4A.

S7: The tunnel switching unit 30 instructs the passing router scanning unit 40 to perform the passing router scan to periodically (for example, at intervals of 50 msec or 1 sec) search for the communication paths.

S8: The instructed passing router scanning unit 40 executes the same process as process S2 in cooperation with the server 9.

S9: The passing router scanning unit 40 refers to the passing router table 41 to determine whether all of the passing IP addresses correspond to the same AS number. If the determination is affirmative, process S10 is executed. If the determination is negative, process S6 is executed.

S10: If the determination is affirmative in process S9, the passing router scanning unit 40 inquires the passing router scanning unit 40 of the opposing VPN router 10B for the scan status.

S11: The passing router scanning unit 40 determines whether the scan result from the opposing VPN router 10B [indicates that all of the passing IP addresses correspond to the same AS number]. If the determination is affirmative, process S12 is executed. If the determination is negative, process S7 is executed.

S12: If the determination is affirmative in process S11, the passing router scanning unit 40 requests the tunnel switching unit 30 to close the IPsec tunnel 4A. The tunnel switching unit 30 refers to the tunnel type table 31 to change the opening status of the IPsec tunnel 4A from [opened] to [not opened (closed)] and then requests the packet processing unit 20 to suspend the packet relay. The packet processing unit 20 stops the packet communication with the packet processing unit 20 of the opposing VPN router 10B through the IPsec tunnel 4A.

S13: If the determination is affirmative in process S5 or after process S12, the passing router scanning unit 40 requests the tunnel switching unit 30 to open the plain text tunnel 4B. The tunnel switching unit 30 refers to the tunnel type table 31 to change the opening status of the plain text tunnel 4B from [not opened (closed)] to [opened] and then requests the packet processing unit 20 to start the packet relay. The packet processing unit 20 carries out the packet communication with the packet processing unit 20 of the opposing VPN router 10B through the plain text tunnel 4B. In this case, the packet processing unit 20 executes, as needed, a retransmission process of the packet for which the relay is suspended in process 12.

S14: The tunnel switching unit 30 instructs the passing router scanning unit 40 for the passing router scan in order to periodically search for the communication paths.

S15: The instructed passing router scanning unit 40 performs the same process as process S2 in cooperation with the server 9.

S16: The passing router scanning unit 40 refers to the passing router table 41 to determine whether all of the passing IP addresses correspond to the same AS number. If the determination is affirmative, process S14 is executed. If the determination is negative, process S17 is executed.

S17: If the determination is negative in process S16, the passing router scanning unit 40 reports the scan result [indicating that not all of the passing IP addresses correspond to the same AS number] to the passing router scanning unit 40 of the opposing VPN router 10B.

S18: If the scan result [indicating that not all of the passing IP addresses correspond to the same AS number] is reported from the passing router scanning unit 40 of the opposing VPN router 10B, the passing router scanning unit 40 receives the scan result.

S19: After process S17 or S18, the passing router scanning unit 40 requests the tunnel switching unit 30 to close the plain text tunnel 4B. The tunnel switching unit 30 refers to the tunnel type table 31 to change the opening status of the plain text tunnel 4B from [opened] to [not opened (closed)] and then requests the packet processing unit 20 to suspend the packet relay. The packet processing unit 20 stops the packet communication with the packet processing unit 20 of the opposing VPN router 10B through the plain text tunnel 4B. Process S6 is executed after process S19.

Effects of First Embodiment

The VPN router 10A in the wide-area intranet-to-intranet communication system SYS of the first embodiment switches the IPsec tunnel 4A and the plain text tunnel 4B to dynamically substitute and use the first communication mode of transmitting and receiving the encrypted communication data (encapsulated encrypted packet) to and from the opposing VPN router 10B through the IPsec tunnel 4A set between the intranets 2 and 3 and the second communication mode of transmitting and receiving the plain text communication data (plain text packet) to and from the opposing VPN router 10B through the plain text tunnel 4B set between the intranets 2 and 3, according to the determination of the difference state of the AS numbers of the communication providers corresponding to the routers as a plurality of relay transfer apparatuses on the passing outward path to the opposing VPN router 10B and on the passing return path from the opposing VPN router 10B.

According to the communication method, the safety of both of the passing outward path to the opposing VPN router 10B and the passing return path from the opposing VPN router 10B is dynamically checked. Therefore, the leakage of the communication data to the outside in the intranet-to-intranet communication can be prevented, and providing of the wideband virtual network service with reduced delay can be promoted.

According to the communication method, the safety of both of the passing outward path to the opposing VPN router 10B and the passing return path from the opposing VPN router 10B can be dynamically checked. Therefore, the fact that a router compatible with a communication provider with a different AS number is newly implemented on the passing path can be certainly determined to prevent the leakage of the communication data to the outside in the intranet-to-intranet communication.

Second Embodiment

In a second embodiment described in detail next, the same matters as in the first embodiment will not be described as long as there is no uncertainty.

[System and VPN Routers]

Figure 8:
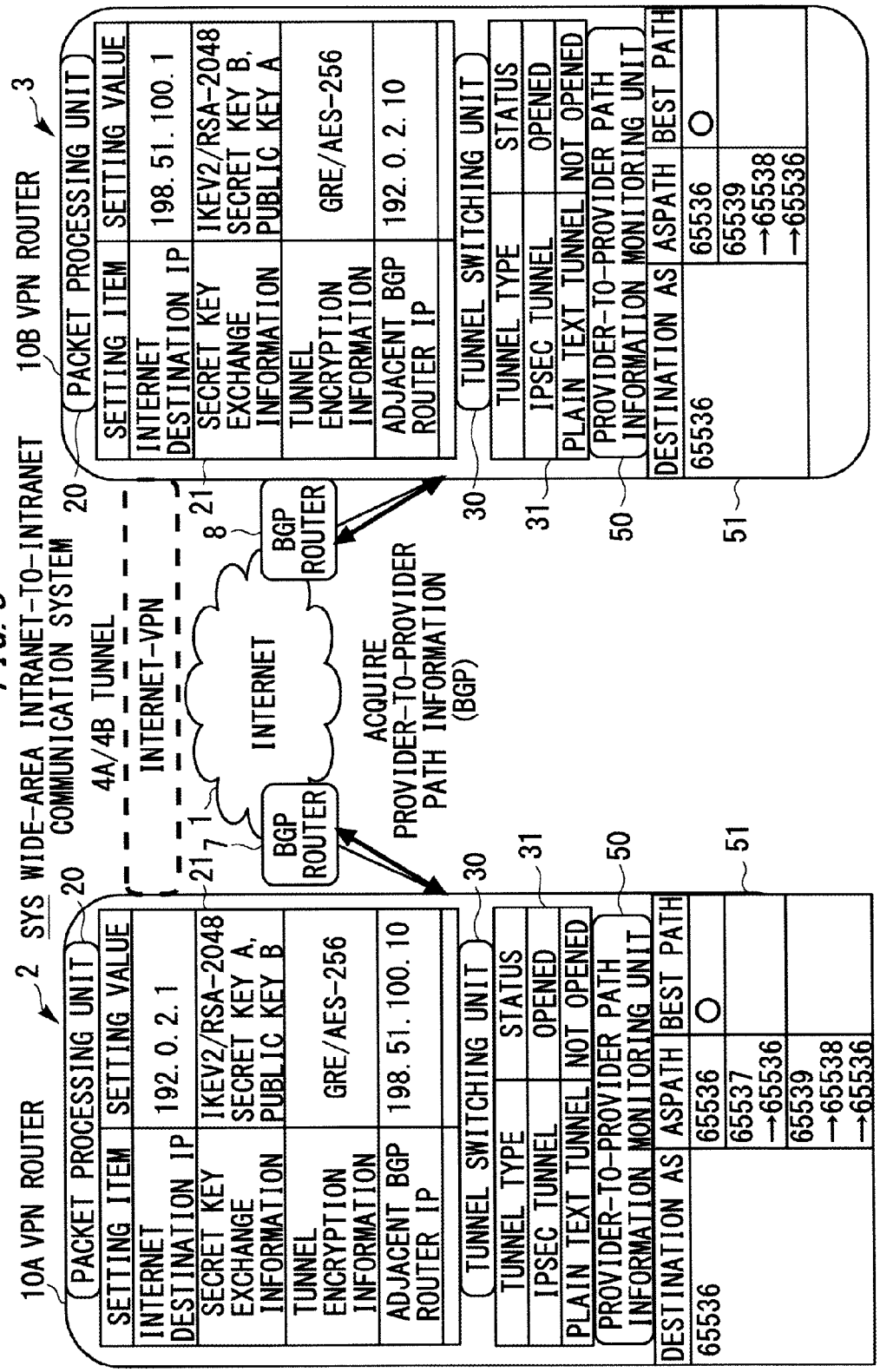
FIG. 8 is a diagram illustrating a configuration of the system and the VPN routers in a second embodiment.

With reference to FIG. 8, in the wide-area intranet-to-intranet communication system SYS of the second embodiment, the VPN router 10A housed in the first intranet 2 and the VPN router 10B housed in the second intranet 3 acquire provider-to-provider path information in cooperation with the BGP router 7 and the BGP router 8 that are edge routers of communication providers equipped as autonomous systems (ASs) on the edges of the Internet 1.

The VPN router 10A and the VPN router 10B as communication apparatuses in the wide-area intranet-to-intranet communication system SYS of the second embodiment include the same hardware constituent elements as those of the VPN router 10A and the VPN router 10B in the wide-area intranet-to-intranet communication system SYS of the first embodiment (see FIG. 4). Each of the VPN router 10A and the VPN router 10B includes, as functional configuration elements, the packet processing unit 20, the tunnel switching unit 30, and a provider-to-provider path information monitoring unit 50 as a determination unit.

Setting items and setting values are associated and stored in the setting information table 21 referenced and set in advance by the packet processing unit 20 based on an instruction from the VPN router manager.

In this example, the setting information table 21 of the VPN router 10A stores (holds) Internet destination IP address: 192.0.2.1, secret key exchange information: IKEv2/RSA-2048, secret key A, and public key B, tunnel encryption information: GRE/AES-256, and adjacent BGP router IP address: 198.51.100.10. The Internet destination IP address [192.0.2.1] is an IP address of an Internet-enabled port of the VPN router 10B in which the opposing relationship is set in advance. The adjacent BGP router IP address [198.51.100.10] is an IP address of the BGP router 7.

The setting information table 21 of the VPN router 10B stores Internet destination IP address: 198.51.100.1, secret key exchange information: IKEv2/RSA-2048, secret key B, and public key A, tunnel encryption information: GRE/AES-256, and adjacent BGP router IP address: 192.0.2.10. The Internet destination IP address [198.51.10.1] is an IP address of an Internet-enabled port of the VPN router 10A in which the opposing relationship is set in advance. The adjacent BGP router IP address [192.0.2.10] is an IP address of the BGP router 8.

Tunnel types and opening statuses are associated and stored in the tunnel type table 31 referenced and set by the tunnel switching unit 30. In this example, IPsec tunnel: opened and plain text tunnel: not opened (closed) are stored as prerequisite (initial) conditions in the tunnel type tables 31 of the VPN routers 10A and 10B.

Destination AS numbers, provider-to-provider path information (ASPATH), and best path identification information are associated and stored in a provider-to-provider path information table 51 referenced and set by the provider-to-provider path information monitoring unit 50. The destination AS number is an ISP provider number (for example, 65536) of the communication provider that performs a connection service in relation to the IP address of the opposing VPN router. The provider-to-provider path information is a list of AS numbers (ISP provider numbers) possessing (operating) passing BGP routers including adjacent BGP routers passed before reaching the destination, that is, AS paths. The best path identification information indicates that the provider-to-provider path information is the shortest path or a shorter path, and a predetermined flag is set for the path.

Which one of the first communication mode of transmitting and receiving the encapsulated encrypted packet through the IPsec tunnel 4A and the second communication mode of transmitting and receiving the encapsulated plain text packet through the plain text tunnel 4B will be adopted when the packet processing unit 20 of each of the VPN routers 10A and 10B executes the packet processing is determined based on cooperation with a provider-to-provider path information acquisition process by the tunnel switching unit 30 and the provider-to-provider path information monitoring unit 50.

To logically realize a provider-to-provider path information acquisition processing function of the packet processing unit 20, the tunnel switching unit 30, and the provider-to-provider path information monitoring unit 50 described in detail later, a control program is installed as an application program on the flash memory 14 in the VPN router 10A and the VPN router 10B. In the VPN router 10A and the VPN router 10B, the CPU 11 executes the control program by expanding the control program in the RAM 12 all the time when the power is activated. The setting information table 21, the tunnel type table 31, and the provider-to-provider path information table 51 can be formed in the flash memory 14.

[Provider-To-Provider Path Information Acquisition Process]

Figure 9:
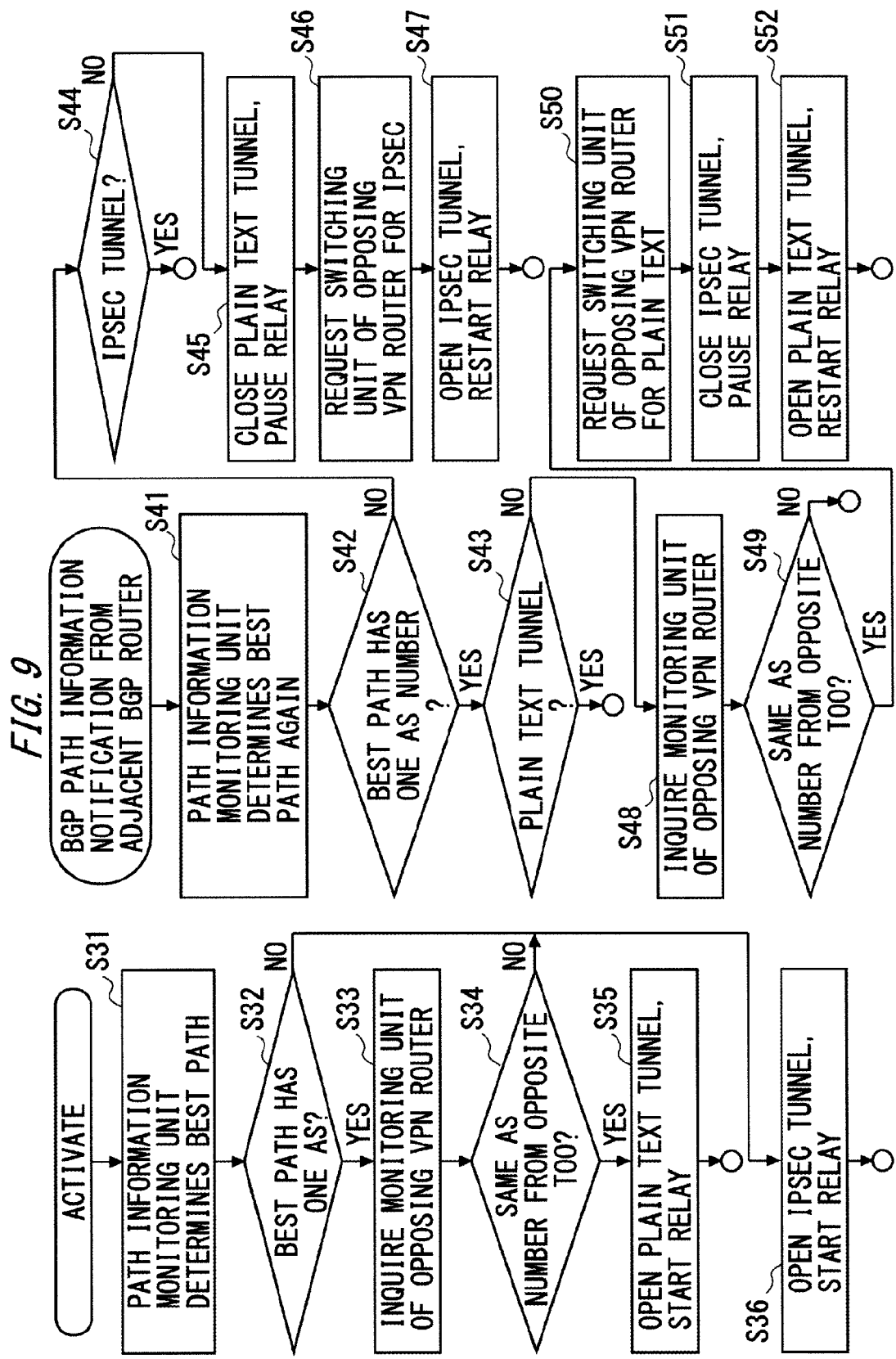
FIG. 9 is a flow chart for describing a provider-to-provider path information acquisition process in the system of the second embodiment.
Figure 10:
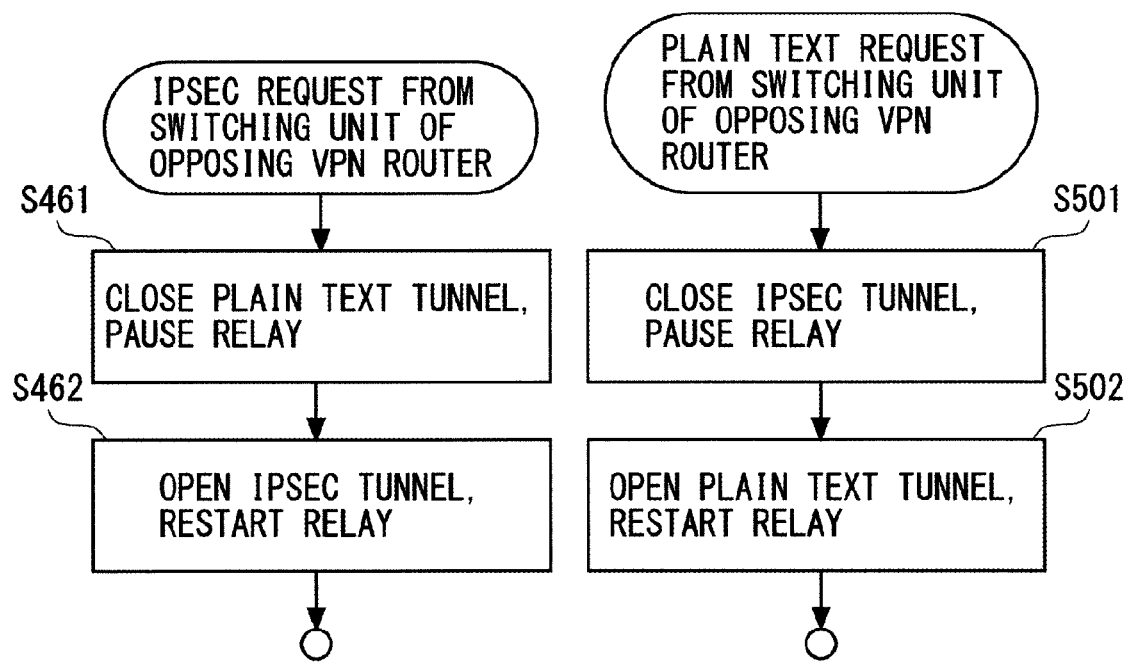
FIG. 10 is a flow chart for describing the provider-to-provider path information acquisition process in the system of the second embodiment.

Subsequently, the provider-to-provider path information acquisition process in the VPN router 10A and the VPN router 10B of the wide-area intranet-to-intranet communication system SYS will be described with reference to FIGS. 8, 9, and 10.

The packet processing units 20, the tunnel switching units 30, and the provider-to-provider path information monitoring units 50 in the VPN router 10A and the VPN router 10B concurrently execute the provider-to-provider path information acquisition process described next, when the units are activated from the control program or when the BGP path information is notified by the BGP routers 7 and 8.

S31 (see FIG. 9): For example, when activated from the control program, the tunnel switching unit 30 in the VPN router 10A instructs the provider-to-provider path information monitoring unit 50 to determine the best path of the communication paths (passing outward paths) to the opposing VPN router 10B.

According to BGP (Border Gateway Protocol), the instructed provider-to-provider path information monitoring unit 50 acquires the provider-to-provider path information from the BGP router 7, which is an edge router of the communication provider equipped as an autonomous system (AS) on the edge of the Internet 1, to the destination AS number [65536] and confirms that the communication path selected by the communication provider does not pass through (go through) a different communication provider.

As a result, the provider-to-provider path information monitoring unit 50 in the VPN router 10A determines the provider-to-provider path information [65536] in the provider-to-provider path information table 51 as the best path and sets a predetermined flag "0".

All BGP routers as edge routers of the communication providers equipped as autonomous systems in the Internet 1 hold latest provider-to-provider path information by exchanging UPDATE messages when there is a change.

S32: The provider-to-provider path information monitoring unit 50 refers to the provider-to-provider path information table 51 to determine whether the best path corresponds to one AS number. If the determination is affirmative, process S33 is executed. If the determination is negative, process S36 is executed.

S33: If the determination is affirmative in process S32, the provider-to-provider path information monitoring unit inquires, for provider-to-provider path information acquisition status, the provider-to-provider path information monitoring unit 50 of the opposing VPN router 10B that similarly and concurrently executes the provider-to-provider path information acquisition process of the communication path (passing return path) to the opposing VPN router 10A.

S34: The provider-to-provider path information monitoring unit 50 determines whether the provider-to-provider path information acquisition result from the opposing VPN router 10B [indicates that the entire best path corresponds to the same AS number]. If the determination is affirmative, process S35 is executed. If the determination is negative, process S36 is executed.

S35: If the determination is affirmative in process S34, the provider-to-provider path information monitoring unit 50 requests the tunnel switching unit 30 to open the plain text tunnel 4B. The tunnel switching unit 30 refers to the tunnel type table 31 to change the opening status of the plain text tunnel 4B from [not opened (closed)] to [opened] and then requests the packet processing unit 20 to start the packet relay. The packet processing unit 20 performs the packet communication with the packet processing unit 20 of the opposing VPN router through the plain text tunnel 4B.

S36: If the determination is negative in process S32 or S34, the provider-to-provider path information monitoring unit 50 requests the tunnel switching unit 30 to open the IPsec tunnel 4A. The tunnel switching unit 30 refers to the tunnel type table 31 to check the opening status [opened] of the IPsec tunnel 4A and then requests the packet processing unit 20 to start the packet relay. The packet processing unit 20 carries out the packet communication with the packet processing unit 20 of the opposing VPN router through the IPsec tunnel 4A.

S41: The tunnel switching unit 30 in the VPN router 10A instructs the provider-to-provider path information monitoring unit 50 to determine the best path of the provider-to-provider path information again when BGP path information is periodically (for example, at intervals of 180 msec or 544 msec) notified by the BGP router 7 or notified by an UPDATE message when there is a change.

According to the protocol BGP, the instructed provider-to-provider path information monitoring unit 50 acquires the provider-to-provider path information from the BGP router 7, which is an edge router of the communication provider equipped as an autonomous system on the edge of the Internet 1, to the destination AS number [65536] and confirms that the communication path selected by the communication provider does not go through different communication providers.

As a result, the provider-to-provider path information monitoring unit 50 in the router 10A sets a predetermined flag for the item of the determined bet path in the updated provider-to-provider path information table 51.

S42: The provider-to-provider path information monitoring unit 50 refers to the provider-to-provider path information table 51 to determine whether the best path corresponds to one AS number. If the determination is affirmative, process S43 is executed. If the determination is negative, process S44 is executed.

S43: If the determination is affirmative in process S42, the provider-to-provider path information monitoring unit 50 asks the tunnel switching unit 30 whether the plain text tunnel 4B is opened. If the plain text tunnel 4B is opened, the packet processing unit 20 continues the packet communication with the packet processing unit 20 of the opposing VPN router through the plain text tunnel 4B. If the determination is negative, process S48 is executed.

S44: If the determination is negative in process S42, the provider-to-provider path information monitoring unit 50 asks the tunnel switching unit 30 whether the IPsec tunnel 4A is opened. If the IPsec tunnel 4A is opened, the packet processing unit 20 continues the packet communication with the packet processing unit 20 of the opposing VPN router through the IPsec tunnel 4A. If the determination is negative, process S45 is executed.

S45: If the determination is negative in process S44, the provider-to-provider path information monitoring unit 50 requests the tunnel switching unit 30 to close the plain text tunnel 4B. The tunnel switching unit 30 refers to the tunnel type table 31 to change the opening status of the plain text tunnel 4B from [opened] to [not opened (closed)] and then requests the packet processing unit 20 to pause the packet relay. The packet processing unit 20 stops the packet communication with the packet processing unit 20 of the opposing VPN router through the plain text tunnel 4B.

S46: After process S45, the provider-to-provider path information monitoring unit 50 requests the tunnel switching unit 30 of the opposing VPN router 10B to make a switch to the IPsec tunnel 4A.

S47: After process S46, the provider-to-provider path information monitoring unit 50 requests the tunnel switching unit 30 to open the IPsec tunnel 4A. The tunnel switching unit 30 refers to the tunnel type table 31 to change the opening status of the IPsec tunnel 4A from [not opened (closed)] to [opened] and then requests the packet processing unit 20 to restart the packet relay. The packet processing unit 20 carries out the packet communication with the packet processing unit 20 of the opposing VPN router through the IPsec tunnel 4A.

S48: If the determination is negative in process S43, the provider-to-provider path information monitoring unit 50 inquires the provider-to-provider path information monitoring unit 50 of the opposing VPN router 10B for the provider-to-provider path information acquisition status.

S49: The provider-to-provider path information monitoring unit 50 determines whether the provider-to-provider path information acquisition result from the opposing VPN router 10B [indicates that the entire best path corresponds to the same AS number]. If the determination is affirmative, process S50 is executed. If the determination is negative, the packet processing unit 20 continues the packet communication with the packet processing unit 20 of the opposing VPN router through the IPsec tunnel 4A.

S50: If the determination is affirmative in process S49, the provider-to-provider path information monitoring unit 50 requests the tunnel switching unit 30 of the opposing VPN router 10B to make a switch to the plain text tunnel 4B.

S51: After process S50, the provider-to-provider path information monitoring unit 50 requests the tunnel switching unit 30 to close the IPsec tunnel 4A. The tunnel switching unit 30 refers to the tunnel type table 31 to change the opening status of the IPsec tunnel 4A from [opened] to [not opened (closed)] and then requests the packet processing unit 20 to pause the packet relay. The packet processing unit 20 stops the packet communication with the packet processing unit 20 of the opposing VPN router through the IPsec tunnel 4A.

S52: After process S51, the provider-to-provider path information monitoring unit 50 requests the tunnel switching unit 30 to open the plain text tunnel 4B. The tunnel switching unit 30 refers to the tunnel type table 31 to change the opening status of the plain text tunnel 4B from [not opened (closed)] to [opened] and then requests the packet processing unit 20 to restart the packet relay. The packet processing unit 20 restarts the packet communication with the packet processing unit 20 of the opposing VPN router through the plain text tunnel 4B.

S461 (see FIG. 10): In relation to process S46, the provider-to-provider path information monitoring unit 50 of the opposing VPN router (for example, VPN router 10B) requested by the tunnel switching unit 30 of the opposing VPN router (for example, VPN router 10A) to make a switch to the IPsec tunnel 4A requests the tunnel switching unit 30 to close the plain text tunnel 4B. The tunnel switching unit 30 refers to the tunnel type table 31 to change the opening status of the plain text tunnel 4B from [opened] to [not opened (closed)] and then requests the packet processing unit 20 to pause the packet relay. The packet processing unit 20 pauses the packet communication with the packet processing unit 20 of the opposing VPN router (for example, VPN router 10A) through the plain text tunnel 4B.

S462: After process S46, the provider-to-provider path information monitoring unit 50 requests the tunnel switching unit 30 to open the IPsec tunnel 4A. The tunnel switching unit 30 refers to the tunnel type table 31 to change the opening status of the IPsec tunnel 4A from [not opened (closed)] to [opened] and then requests the packet processing unit 20 to restart the packet relay. The packet processing unit 20 carries out the packet communication with the packet processing unit 20 of the opposing VPN router through the IPsec tunnel 4A.

S501 (see FIG. 10): In relation to process S50, the provider-to-provider path information monitoring unit 50 of the opposing VPN router (for example, VPN router 10B) requested by the tunnel switching unit 30 of the opposing VPN router (for example, VPN router 10A) to make a switch to the plain text tunnel 4B requests the tunnel switching unit 30 to close the IPsec tunnel 4A. The tunnel switching unit 30 refers to the tunnel type table 31 to change the opening status of the IPsec tunnel 4A from [opened] to [not opened (closed)] and then requests the packet processing unit 20 to pause the packet relay. The packet processing unit 20 pauses the packet communication with the packet processing unit 20 of the opposing VPN router (for example, VPN router 10A) through the IPsec tunnel 4A.

S502: After process S501, the provider-to-provider path information monitoring unit 50 requests the tunnel switching unit 30 to open the plain text tunnel 4B. The tunnel switching unit 30 refers to the tunnel type table 31 to change the opening status of the plain text tunnel 4B from [not opened (closed)] to [opened] and then requests the packet processing unit 20 to restart the packet relay. The packet processing unit 20 carries out the packet communication with the packet processing unit 20 of the opposing VPN router through the plain text tunnel 4B.

Effects of Second Embodiment

The wide-area intranet-to-intranet communication system SYS of the second embodiment has the same effects as those of the system of the first embodiment.

Modified Example

Figure 11:
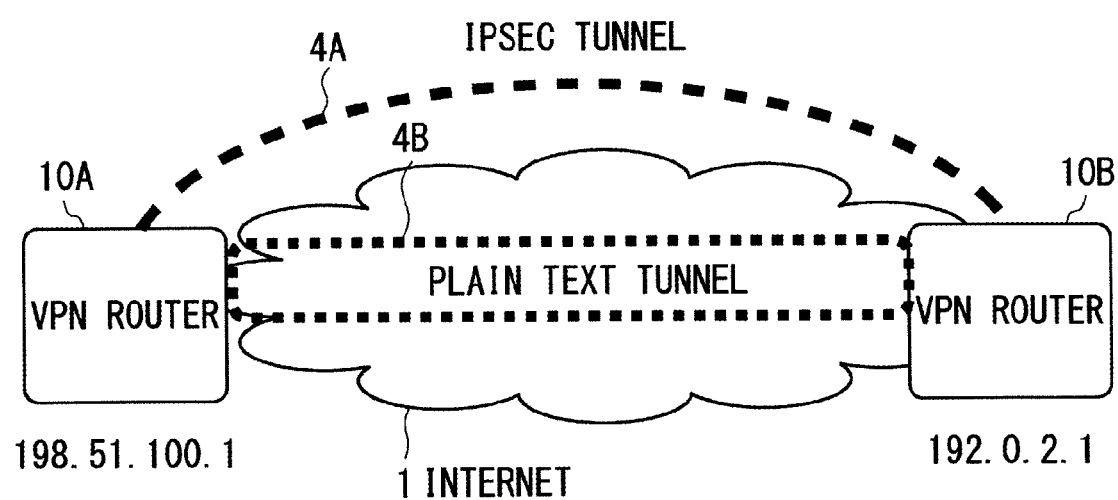
FIG. 11 is a diagram for describing the system and the VPN routers in a modified example.

Both of the IPsec tunnel 4A and the plain text tunnel 4B in the wide-area intranet-to-intranet communication system SYS of the first and second embodiments may be set in advance as standby virtual communication channels for transferring encapsulated encrypted packets that are encrypted communication data and as active virtual communication channels for transferring plain text packets that are plain text communication data and may be switched and used according to the difference state of the AS numbers of the communication providers corresponding to a plurality of routers on the passing outward path to the opposing VPN router 10B and on the passing return path from the VPN router 10B (see FIG. 11).

According to the modified example, when it is determined that a router compatible with a communication provider with a different AS number is newly implemented on the passing path, the switching time can be reduced by instantaneously switching the plain text tunnel 4B of the active virtual communication channel to the IPsec tunnel 4A of the standby virtual communication channel.

The processing of the embodiments and the modified example described above is provided as a computer-executable program, and can be provided by a non-transitory computer readable recording medium such as a CD-ROM or a flexible disk or via a communication line.

An arbitrary plurality of or all the processes of the embodiments and the modified example described above can be selected and combined to be carried out.

What is claimed is:

1. A communication method executed by a processor, the communication method comprising:
   acquiring identification numbers of communication providers corresponding to a plurality of relay transfer apparatuses on a passing outward path to an opposing communication apparatus;
   determining a first difference state of the identification numbers of the communication providers corresponding to the plurality of relay transfer apparatuses on the passing outward path to the opposing communication apparatus;
   acquiring a result of determining a second difference state of identification numbers of communication providers corresponding to a plurality of relay transfer apparatuses on a passing return path from the opposing communication apparatus; and
   switching a first virtual communication channel set between intranets and a second virtual communication channel set between the intranets to dynamically substitute and use a first communication mode of transmitting and receiving encrypted communication data to and from the opposing communication apparatus through the first virtual communication channel and a second communication mode of transmitting and receiving plain text communication data to and from the opposing communication apparatus through the second virtual communication channel, according to the determination of both of the first difference state and the second difference state;
   wherein both of the first virtual communication channel and the second virtual communication channel are set in advance as a standby virtual communication channel for transferring the encrypted communication data and as an active virtual communication channel for transmitting the plain text communication data respectively, and the both are switched and used according to the determination of both of the first difference state and the second difference state.

2. The communication method according to claim 1, wherein
   the first virtual communication channel is switched to the second virtual communication channel to use the second communication mode when it is determined that the identification numbers of the communication providers corresponding to the plurality of relay transfer apparatuses on the passing outward path to the opposing communication apparatus and on the passing return path from the opposing communication apparatus are in a same state.

3. The communication method according to claim 1, wherein
   the first virtual communication channel and the second virtual communication channel are set by tunneling connection,
   the encrypted communication data is an encapsulated encrypted packet, and
   the plain text communication data is an encapsulated plain text packet.

4. A communication apparatus comprising a memory storing executable instructions; and a processor connected to the memory and configured to execute the instructions, execution of the instructions causes the processor to:
   acquire identification numbers of communication providers corresponding to a plurality of relay transfer apparatuses on a passing outward path to an opposing communication apparatus;
   determine a first difference state of the identification numbers of the communication providers corresponding to the plurality of relay transfer apparatuses on the passing outward path to the opposing communication apparatus;
   acquire a result of determining a second difference state of identification numbers of communication providers corresponding to a plurality of relay transfer apparatuses on a passing return path from the opposing communication apparatus; and
   switch a first virtual communication channel set between intranets and a second virtual communication channel set between the intranets to dynamically substitute and use a first communication mode of transmitting and receiving encrypted communication data to and from the opposing communication apparatus through the first virtual communication channel and a second communication mode of transmitting and receiving plain text communication data to and from the opposing communication apparatus through the second virtual communication channel, according to the determination of both of the first difference state and the second difference state;
   wherein both of the first virtual communication channel and the second virtual communication channel are set in advance as a standby virtual communication channel for transferring the encrypted communication data and as an active virtual communication channel for transmitting the plain text communication data respectively, and the both are switched and used according to the determination of both of the first difference state and the second difference state.

5. A non-transitory readable medium recorded with a program that causes a processor to execute processing comprising:
  acquiring identification numbers of communication providers corresponding to a plurality of relay transfer apparatuses on a passing outward path to an opposing communication apparatus;
  determining a first difference state of the identification numbers of the communication providers corresponding to the plurality of relay transfer apparatuses on the passing outward path to the opposing communication apparatus;
  acquiring a result of determining a second difference state of identification numbers of communication providers corresponding to a plurality of relay transfer apparatuses on a passing return path from the opposing communication apparatus; and
  switching a first virtual communication channel set between intranets and a second virtual communication channel set between the intranets to dynamically substitute and use a first communication mode of transmitting and receiving encrypted communication data to and from the opposing communication apparatus through the first virtual communication channel and a second communication mode of transmitting and receiving plain text communication data to and from the opposing communication apparatus through the second virtual communication channel, according to the determination of both of the first difference state and the second difference state;
  wherein both of the first virtual communication channel and the second virtual communication channel are set in advance as a standby virtual communication channel for transferring the encrypted communication data and as an active virtual communication channel for transmitting the plain text communication data respectively, and the both are switched and used according to the determination of both of the first difference state and the second difference state.

* * * * *